United States Patent
Ware et al.

(10) Patent No.: US 6,485,199 B1
(45) Date of Patent: Nov. 26, 2002

(54) DISPOSABLE OPTICAL FIBER SPLICE SLEEVE AND METHOD FOR APPLYING SAME

(75) Inventors: Scot K. Ware, Brentwood, TN (US); Brett G. Clark, Whites Creek, TN (US)

(73) Assignee: Amherst Holding Co., Wilmington, DE (US)

( * ) Notice: Subject to any disclaimer, the term of this patent is extended or adjusted under 35 U.S.C. 154(b) by 0 days.

(21) Appl. No.: 09/548,722

(22) Filed: Apr. 13, 2000

(51) Int. Cl.[7] .............................................. G02B 6/255
(52) U.S. Cl. .......................................... 385/99; 385/95
(58) Field of Search .............................. 385/88–99, 147, 385/134–137

(56) References Cited

U.S. PATENT DOCUMENTS

| | | |
|---|---|---|
| 3,810,802 A | 5/1974 | Buhite et al. |
| 4,077,702 A | 3/1978 | Kunze et al. |
| 4,129,932 A | 12/1978 | Stancati |
| 4,131,404 A | 12/1978 | Dubost et al. |
| 4,179,186 A | 12/1979 | Tynes |
| 4,183,737 A | 1/1980 | Chown et al. |
| 4,254,865 A | 3/1981 | Pacey et al. |
| 4,261,644 A | 4/1981 | Giannaris |
| 4,404,010 A | 9/1983 | Bricheno et al. |
| 4,410,009 A | 10/1983 | Blum |
| 4,410,561 A | 10/1983 | Hart, Jr. |
| 4,435,038 A | 3/1984 | Soes et al. |
| 4,509,820 A  * | 4/1985 | Murata et al. ................. 156/86 |
| 4,525,312 A | 6/1985 | Jones |
| 4,537,468 A | 8/1985 | Degoix et al. |
| 4,585,304 A | 4/1986 | Winter et al. |
| 4,586,610 A | 5/1986 | Gandolfo |

(List continued on next page.)

FOREIGN PATENT DOCUMENTS

| | | | | |
|---|---|---|---|---|
| GB | 2136349 A | * | 9/1984 | .................. 385/99 |
| GB | 2 136 349 A | | 9/1984 | |
| JP | 05-157929 A | * | 6/1993 | ........... G02B/6/255 |

OTHER PUBLICATIONS

Technical Staff of CSELT "Fober Optic Communications Handbook" p. 430.*
Tosco, Federico, *Fiber Optic Communications Handbook*, Second Edition, 1990, p. 730.
http://www.aca–inc.com/heat.htm, Fiber Optic Splicing Products by ACA, *Heat Shrink Protection Cover*, Jan. 24, 2000, 2 pages.
http://www.aca–inc.com/mass.htm, Fiber Optic Splicing Products by ACA, *MASSsleeve® Information*, Jan. 24, 2000, 2 pages.

(List continued on next page.)

*Primary Examiner*—John D. Lee
*Assistant Examiner*—Michelle R. Connelly-Cushwa
(74) *Attorney, Agent, or Firm*—Banner & Witcoff, Ltd.

(57) ABSTRACT

A recoating splice sleeve is provided to protect fused or jointed optical fibers, at and adjacent their point of fusion, against environmental damage and to restore adequate strength at the splice after the fusion. The recoating splice sleeve includes an inner tube, and an outer tube having a portion with diminished structure integrity such that the portion is easily broken to facilitate removal of the outer tube. The inner tube is made of a fiber recoating material. The splice sleeve is positioned over the point of fusion of the fibers. The splice sleeve, together with the fused optical fibers, are heated in order to melt the fiber recoating material around the fused fibers. Once the fiber recoating material of the inner tube has cured around the fused fibers, the outer tube is separated along a tube separation assist feature such as a portion having diminished structural integrity, removed and discarded.

42 Claims, 8 Drawing Sheets

U.S. PATENT DOCUMENTS

| | | |
|---|---|---|
| 4,627,942 A | 12/1986 | Gagen et al. |
| 4,636,271 A | 1/1987 | Gandolfo |
| 4,662,307 A | 5/1987 | Amos et al. |
| 4,678,272 A | 7/1987 | Finn et al. |
| 4,709,986 A * | 12/1987 | Hicks, Jr. .................. 385/126 |
| 4,714,316 A | 12/1987 | Moore et al. |
| 4,746,189 A | 5/1988 | Arrington et al. |
| 4,778,242 A | 10/1988 | Ota et al. |
| 4,818,055 A | 4/1989 | Patterson |
| 4,846,545 A | 7/1989 | Estabrook et al. |
| 4,863,234 A | 9/1989 | Gladenbeck et al. |
| 5,009,474 A | 4/1991 | Wurmser et al. |
| 5,022,735 A | 6/1991 | Dahlgren |
| 5,061,034 A | 10/1991 | Fujikawa et al. |
| 5,087,492 A | 2/1992 | Vallauri et al. |
| 5,093,048 A | 3/1992 | Kagan |
| 5,141,545 A | 8/1992 | Grigsby |
| 5,222,171 A | 6/1993 | Straus |
| 5,247,598 A | 9/1993 | Takimoto et al. |
| 5,261,018 A | 11/1993 | Suganuma et al. |
| 5,367,589 A | 11/1994 | MacDonald et al. |
| 5,367,591 A | 11/1994 | Seike et al. |
| 5,372,758 A | 12/1994 | Lundström et al. |
| 5,416,873 A | 5/1995 | Huebscher et al. |
| 5,430,821 A | 7/1995 | Sasoka et al. |
| 5,450,513 A | 9/1995 | Bookbinder et al. |
| 5,638,477 A | 6/1997 | Patterson et al. |
| 5,731,051 A | 3/1998 | Fahey et al. |
| 5,748,817 A | 5/1998 | Xu et al. |
| 5,832,162 A * | 11/1998 | Sarbell ........................ 385/99 |
| 5,908,873 A | 6/1999 | Shustack |

OTHER PUBLICATIONS http://www.aca–inc.com/fsspec.htm, Fiber Optic Splicing Products by ACA, *ULTRAsleeve® Information*, Jan. 24, 2000, 2 pages.

http://www.amherstfo.com/fiber1.htm, Amherst FiberOptics Fiber Optic Recoaters –EFR 2000 Fiber Recoater, *Fiber Recoaters*, Jan. 24, 2000, 2 pages.

Ericsson, *Fiber Recoater—EFR 1000*, general information, date unknown, but prior to Apr. 2000, 1 sheet (front and back).

* cited by examiner

DISPOSABLE OPTICAL FIBER SPLICE SLEEVE AND METHOD FOR APPLYING SAME

FIELD OF THE INVENTION

The present invention relates to an optical fiber splice sleeve and a method for applying the splice sleeve to recoat jointed optical fibers. More specifically, the present invention relates to an optical fiber splice sleeve with a disposable outer tube having a portion with diminished structural integrity, which portion facilitates removal of the outer tube.

BACKGROUND OF THE INVENTION

Optical fiber lengths are connected or jointed together for many purposes including establishing long distance links. This type of connection is called a splice. For maximum performance, the splice should have the best possible alignment between the fiber cores, and retain that alignment. Splices can generally be categorized as mechanical splices or fusion splices, based on their principle of operation. Fusion splicing is an efficient technique for permanently jointing two fibers, and is known for its ability to achieve tight tolerances. However, very low signal loss and high mechanical strength are very difficult to achieve simultaneously in a fusion splice. Accordingly, it is necessary to protect the fusion fibers against environmental damage and to restore adequate strength at the point of the fusion splice. Often, a heat shrink tube is used to protect the splice point, since fusion spliced optical fibers show a significantly reduced tensile strength. However, more and more optical fiber is used in special applications like gyros and optical amplifiers where the fiber needs to be coiled up with a rather narrow diameter. For these applications it is not recommended to use heat shrink tubes, since they "stiffen" parts of the fiber.

Fiber recoating methods have been developed to provide splice protection and reinforcement without the use of heat shrink tubes. However, these prior fiber recoating methods have certain disadvantages. An apparatus for effecting one such recoating method is disclosed in U.S. Pat. No. 5,093, 048, and is depicted in FIG. 1. A mold 18 includes spaced cylindrical passages 14 for securely clamping the optical fiber cable ends in place. The interior ends of the passages 14 open into a central enlarged cylindrical chamber 12 through which extend the spliced fiber optics 6 and 8. An inlet 16, formed in the body of the mold 18, allows the introduction of epoxy material into the central chamber 12. The epoxy surrounds the exposed fiber optics, including the fusion point 10. The mold is typically fabricated from a transparent plastic material, and a light-curable epoxy is used. The epoxy cures when exposed to light from a visible light source. Once the epoxy has cured, the recoated cable is removed from the mold.

The foregoing recoating technique for applying the splice sleeve has some significant disadvantages. First, a mold is required to accept the optical fibers and the epoxy, which seals the point of fusion of the optical fibers. Therefore, precisely toleranced molds must be used to facilitate recoating of the optical fibers. In addition, a visible light source is required to cure the epoxy for the splice sleeve. Accordingly, this conventional technique is cumbersome and expensive.

Another recoating technique is disclosed in Great Britain published application no. 2 136 349 A, and illustrated in FIGS. 2A and 2B. A fusion spice 24 is formed between optical fibers 20 having a cladding 22 of hardened resin. A semi-fluid resin 26 is applied to one surface of a length of tape 28. The tape 28 is folded around the fusion splice 24 to form a mold cavity 30. The volume of the mold cavity 30 is reduced by continuously squeezing the overlying end parts 36 of the tape 28 together by drawing them through a slot 34 of a die 38 to ensure that the mold cavity 30 is filled with resin 26. The resin is cured when it is exposed to UV light from a UV light source. After the resin 26 has cured, the tape 28 is peeled away.

This fiber recoating method also suffers from significant disadvantages. First, a die is required to continuously squeeze the tape to ensure that the mold cavity is filled with resin. In addition, a UV light source is required to cure the resin for the splice sleeve.

Therefore, a fiber recoating technique is needed which would reduce the number of necessary parts and the cost associated with the prior art fiber recoating techniques. The present invention was developed to accomplish these and other objectives.

SUMMARY OF THE INVENTION

In view of the foregoing, it is a principal object of the present invention to provide an improved optical fiber recoating sleeve and method for applying the same.

It is also an object of the present invention to provide an improved fiber recoating apparatus and technique, which eliminates the disadvantages associated with the mold, light source and die of the conventional recoating systems.

These and other objects are achieved by the present invention which, according to one aspect, provides an apparatus for recoating fused optical fibers which includes a tube and a fiber recoating material positioned inside of the tube, where the tube comprises a portion which facilitates separation and removal of the tube from the fiber recoating material.

According to another aspect of the present invention, an apparatus for recoating fused optical fibers is provided which includes a tube and a fiber recoating material positioned inside of the tube, where the tube is made from a non-stick material.

According to yet another aspect of the present invention, an apparatus for recoating fused optical fibers is provided which includes a tube and a fiber recoating material positioned inside of the tube, where an inner surface of the tube is coated with a non-stick material.

According to another aspect of the present invention, an apparatus for recoating fused optical fibers which includes a tube and a fiber recoating material positioned inside of the tube, where the tube is removable along a perforated portion.

According to yet another aspect of the present invention, an apparatus for recoating fused optical fibers is provided which includes a tube and a fiber recoating material positioned inside of the tube, where the tube comprises a molded imperfection which facilitates separation and removal of the tube from the fiber recoating material.

In yet another aspect of the present invention, an apparatus for recoating fused optical fibers is provided which includes a tube and a fiber recoating material positioned inside of the tube, where the tube comprises an element embedded in a portion of the tube which facilitates separation and removal of the tube from the fiber recoating material.

In another aspect of the present invention, a method of protecting and reinforcing fused optical fibers at a point of fusion is provided. The method includes providing a recoating sleeve comprising a hollow tube and recoating material disposed within the tube, positioning the recoating sleeve over the point of fusion, heating the recoating sleeve, and removing the tube to expose the recoating material.

These and other objects and features of the present invention will be apparent upon consideration of the following detailed description of preferred embodiments thereof, presented in connection with the following drawings in which like reference numerals identify like elements throughout.

DETAILED DESCRIPTION OF THE PREFERRED EMBODIMENT

Figure 1:
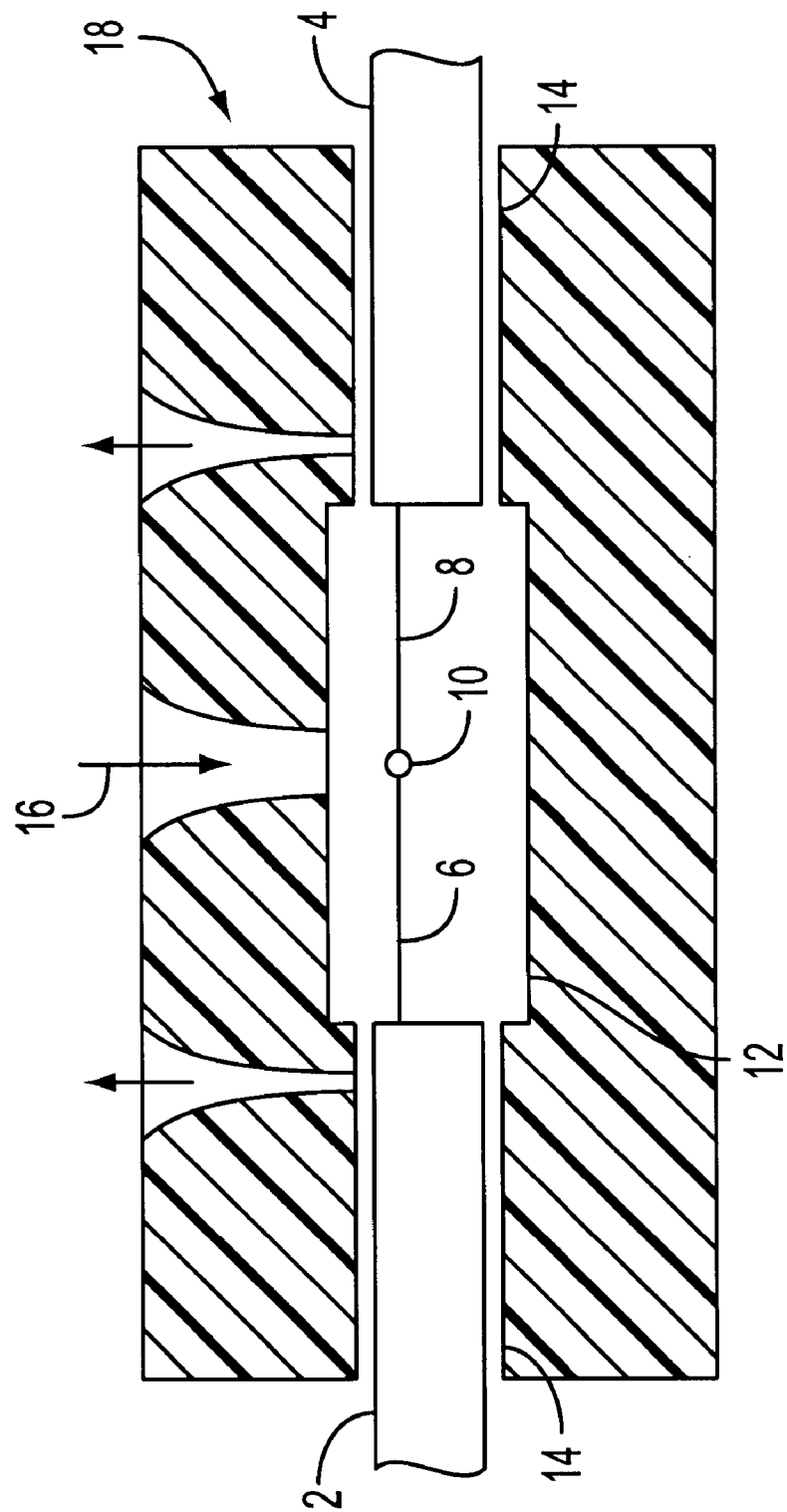
FIG. 1 is a longitudinal cross-sectional view of a prior art mold containing a spliced fiber optic cable prior to recoating.
Figure 2A:
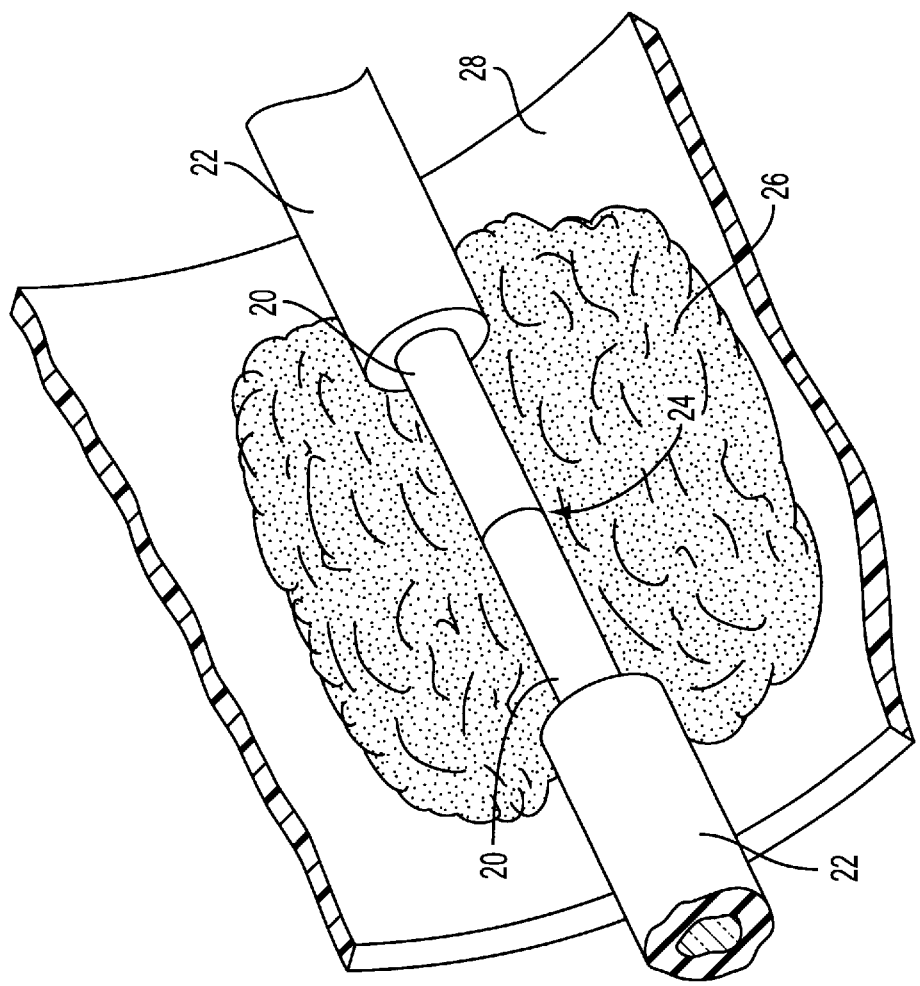
FIG. 2A illustrates a preliminary stage of an optical fiber recoating device according to the prior art.
Figure 2B:
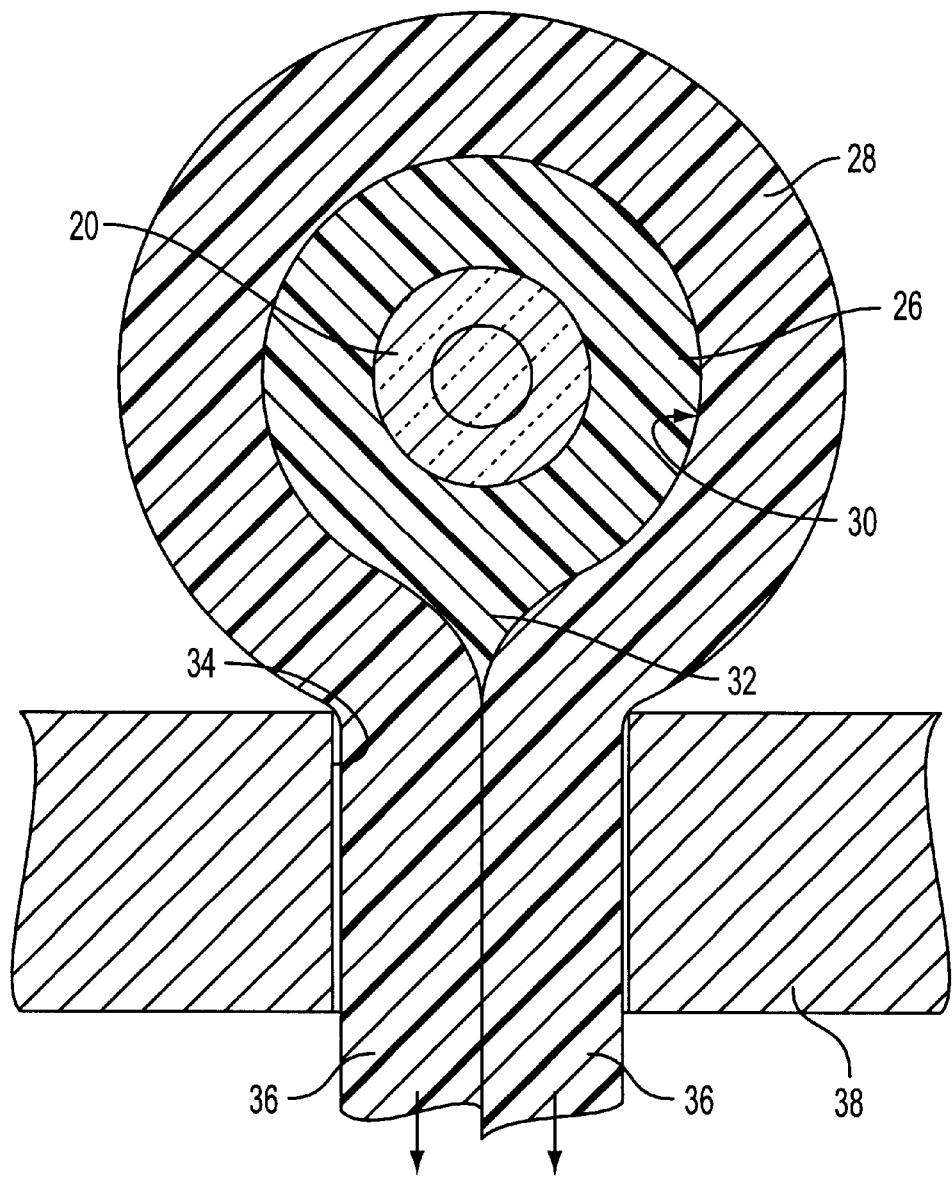
FIG. 2B is a transverse cross-sectional view of the prior art optical fiber recoating device prepared as shown in FIG. 2A.
Figure 3:
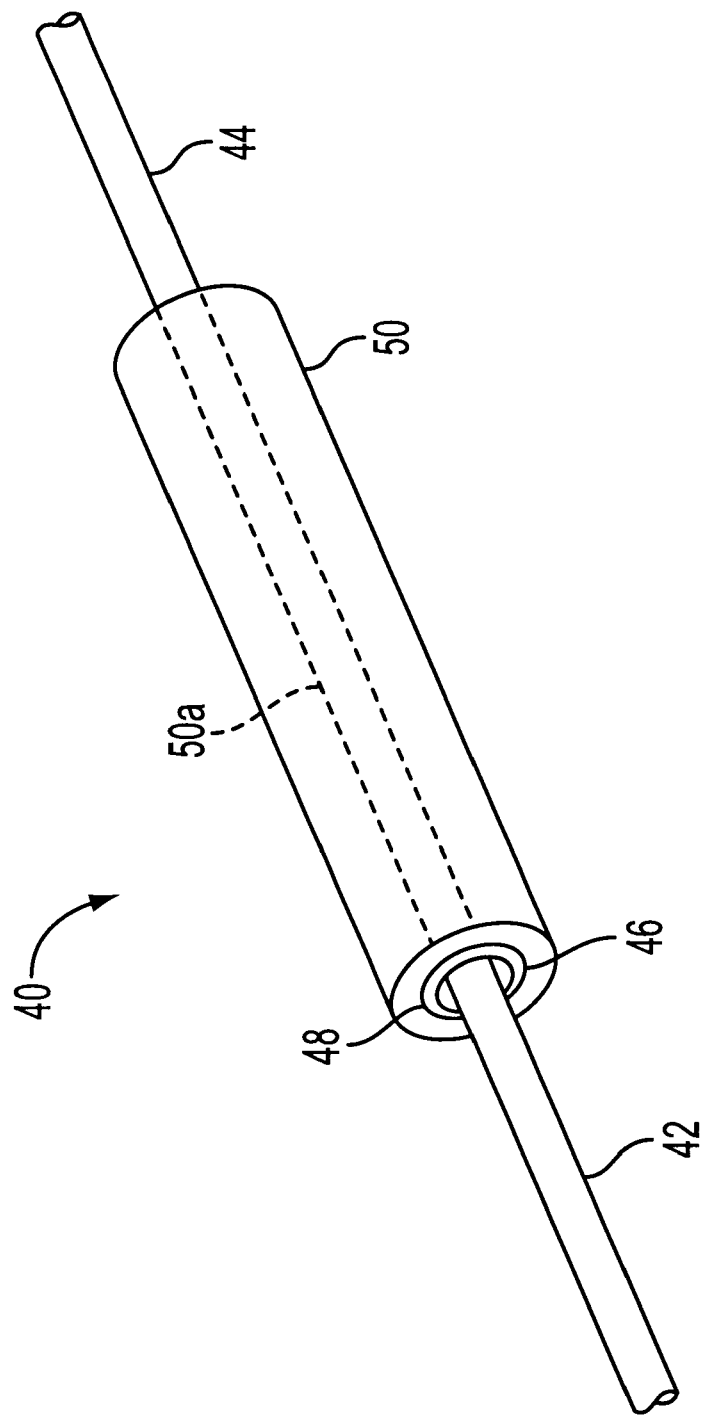
FIG. 3 is a perspective view of a recoating splice sleeve according to a first embodiment of the present invention.
Figure 4:
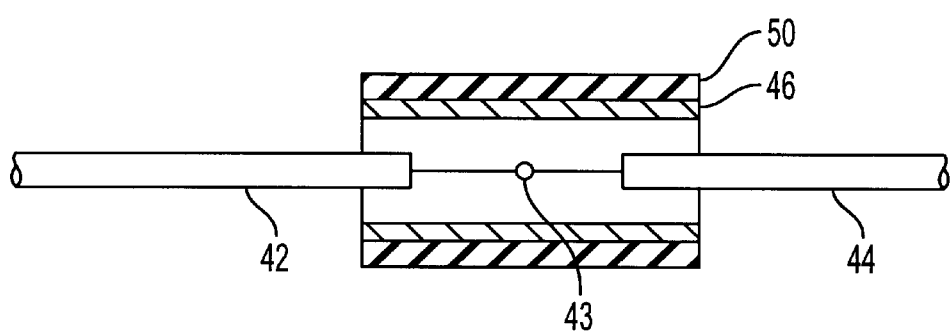
FIG. 4 is longitudinal cross-sectional view of the recoating splice sleeve illustrated in FIG. 3.

In the present invention, as illustrated in FIGS. 3–8, a recoating optical fiber splice sleeve is designated generally by reference numeral 40. Recoating splice sleeve 40 is used to protect fused or jointed optical fibers 42 and 44, at and adjacent their point of fusion 43, against environmental damage, and to restore adequate strength by creating a suitable reinforcement at the splice after fusion. This is done by recoating the spliced fiber section, where optical fibers have been stripped for splicing.

As shown in FIGS. 3–8, recoating splice sleeve 40 includes an inner tube 46 and an outer tube 50. Outer tube 50 is disposed around the inner tube 46. In a preferred arrangement, the inner tube 46 and the outer tube 50 are secured together by friction. The thickness of the inner tube 46 is preferably sized to approximate the thickness of the cladding of the fiber to be recoated. The thickness of the outer tube 50 may be any desirable size as it is eventually removed.

In use, the recoating splice sleeve 40 is positioned over the end of an optical fiber 42, for example, after it is prepared for fusion splicing, but before fusing it to at least one other optical fiber 44. Therefore, prior to fusion, one of the optical fibers is threaded through the inner tube 46, which is surrounded by the outer tube 50. After fusion splicing is performed, the recoating splice sleeve 40 is positioned along the spliced fiber to cover the fusion splicing point 43. Usually, the fusion splicing point 43 is positioned approximately at the center of the recoating splice sleeve 40. Upon the application of heat, the inner tube 46 melts around the fused optical fibers 42 and 44. The outer tube 50 preferably has some heat shrinking capability to help the adhesive distribute around the fused fibers 42 and 44. Once the inner tube 46 cools sufficiently around the fused optical fibers 42 and 44, the outer tube 50 is removed and discarded.

Inner tube 46 is preferably made from heat meltable adhesive tubing, i.e., a hot melt adhesive hollow tube, that surrounds the fused fibers 42 and 44 when properly positioned. Inner tube 46 will melt when heated to a predetermined temperature for a predetermined period of time. One preferred material for the inner tube is a hot-melt glue. The hot melt tubing may be, for example, ethylene vinyl acetate (EVA). However, it is recognized that other materials can be used. A conventional heat oven may be used, for example, to heat the sleeve 40 so that the inner tube 46 melts and coats the fused optical fibers 42 and 44 at and adjacent the point of fusion 43.

According to one aspect of the present invention, the outer tube 50 is made from a non-stick material such as a polymer of polytetrafluoroethylene having extreme chemical inertness. Once such material is TEFLON™. The non-stick material facilitates removal of the outer tube by enabling easy separation of the outer tube 50 from the hardened inner tube 46 upon cooling. However, it is recognized that the outer tube 50 may be made from other materials.

Alternatively, the outer tube 50 includes an inner surface 48 coated with a non-stick material, such as TEFLON™, to facilitate separation of the outer tube 50 from the cured inner tube 46. In such an arrangement, the outer tube 50 may be made of any appropriate material such as a heat shrinkable material such as polyolefin, for example.

Referring to FIGS. 3–8, the outer tube 50 includes a portion 50a having a tube separation assist feature that assists in the removal of the outer tube. For example, the tube separation assist feature of portion 50a may be a portion where the tube separation assist feature includes diminished structural integrity of portion 50a. As used herein, the term tube separation assist feature is any feature directly associated with the outer tube to assist its separation and removal. Portion 50a is easily broken or compromised to facilitate removal of the outer tube 50, once the inner tube 46 has hardened around the fused optical fibers. In FIGS. 3–8, portion 50a is shown as extending in a longitudinal direction on a portion of the outer tube 50. However, portion 50a may be arranged in any configuration which facilitates removal of the outer tube 50.

Figure 5:
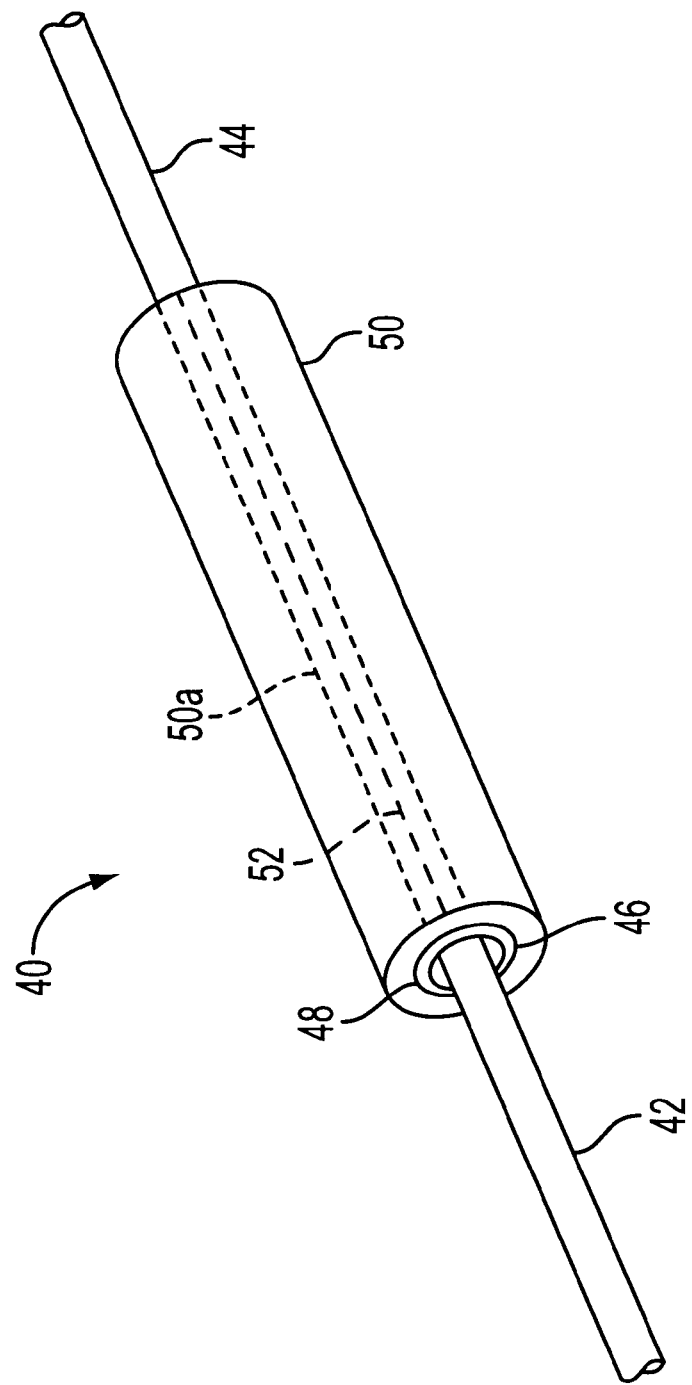
FIG. 5 is a perspective view of a recoating splice sleeve according to a second embodiment of the present invention.

In FIG. 5, the tube separation assist feature of portion 50a includes a series of slots or other shaped perforations 52 that extend in a longitudinal direction of the outer tube 50. The perforations 52 may be formed in the outer tube 50 by any known and appropriate method. For example, they can be molded in place with the tube or formed in a secondary step. It is not necessary for the perforations 52 to extend through the entire thickness of the outer tube 50 or to extend for the entire length of the outer tube 50. The perforations 52 need only extend through enough of the tube thickness and length to facilitate a user to separate the outer tube 50. Once the inner tube 46 has hardened around the fused optical fibers 42 and 44, the outer tube 50 is removed by separating the outer tube 50 along the perforations 52. Such a step could be performed with or without tools. The outer tube 50 can then be discarded.

Figure 6:
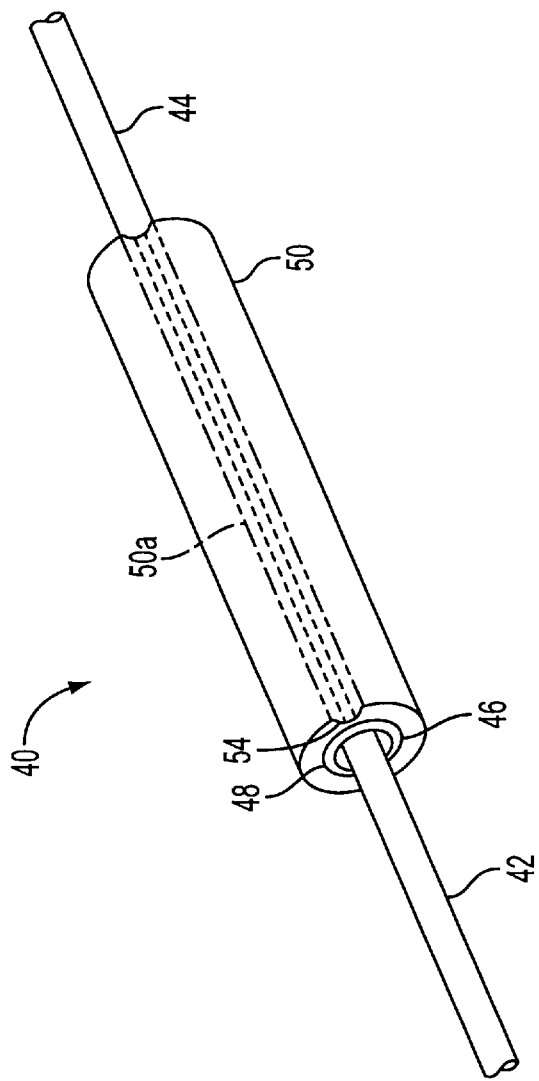
FIG. 6 is a perspective view of a recoating splice sleeve according to a third embodiment of the present invention.
Figure 7:
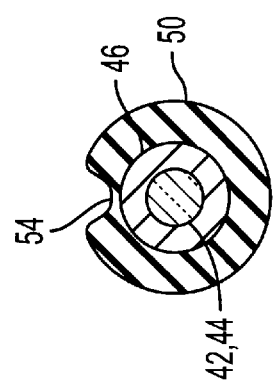
FIG. 7 is a cross-sectional view of the recoating splice sleeve illustrated in FIG. 6.

FIGS. 6 and 7 illustrate another embodiment for the outer tube 50 of the recoating splice sleeve 40. According to this embodiment, the tube separation assist feature of portion 50a includes a molded imperfection 54 extending in a longitudinal direction. The molded imperfection 54 may take the form of a notch in the outer surface of the tube 50 that extends longitudinally from one end of the tube 50 to the other. The molded imperfection is easily broken to facilitate removal of the outer tube 50. More particularly, the outer tube 50 may be removed from the cured inner tube 46 by applying pressure on the outer tube 50 at portion 50a to separate the outer tube 50. For example, the outer tube 50 may be separated by applying pressure on opposing sides of portion 50a to separate or crack the outer tube 50. Pressure is continuously applied along portion 50a until the outer tube 50 is entirely separated. Pressure, sufficient to break and separate the outer tube 50, may be applied at portion 50a by hand, with or without a tool. Once the outer tube 50 has been separated, it is removed and discarded.

Figure 8:
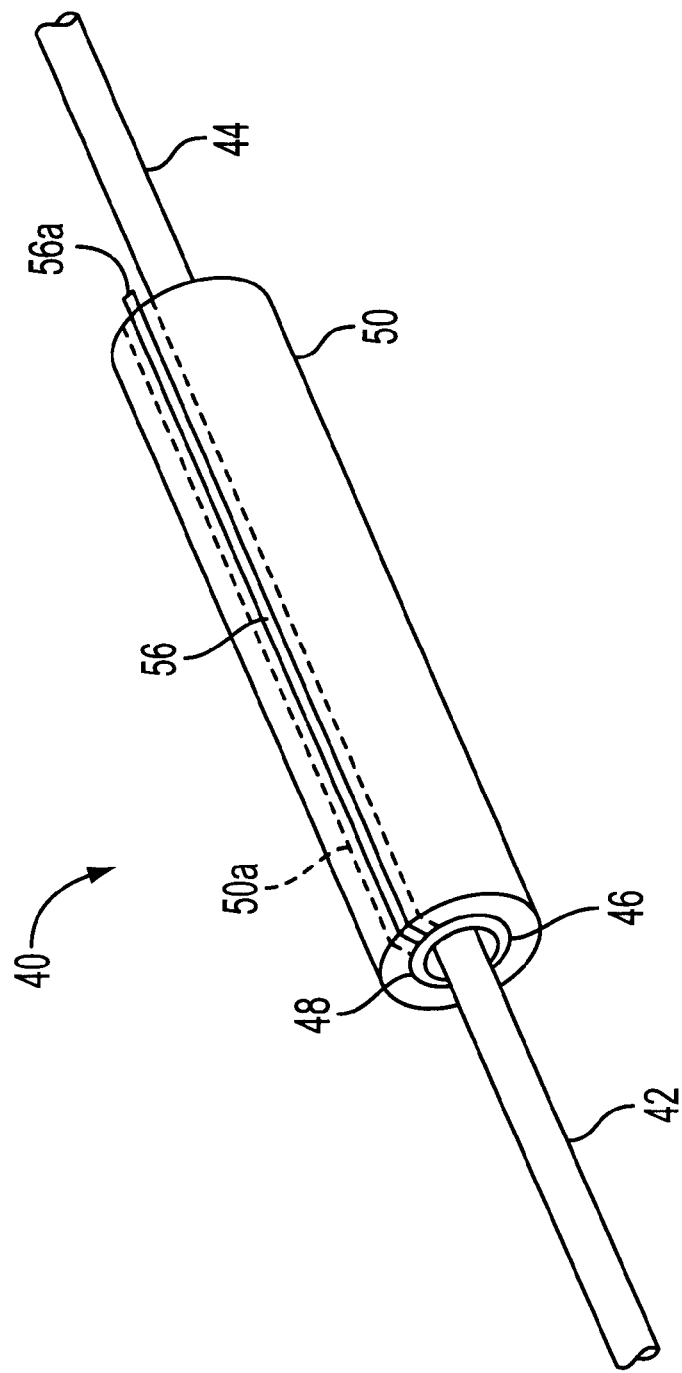
FIG. 8 is a perspective view of a recoating splice sleeve according to a fourth embodiment of the present invention.

Another embodiment of the present invention is illustrated in FIG. 8. The tube separation assist feature includes a material 56 embedded in portion 50a of the outer tube 50. In FIG. 8, the embedded material 56 is shown as extending in a longitudinal direction and extending beyond one end of the outer tube 50 to form a tab 56a. The embedded material is preferably a fiber or other thin, elongated element. The embedded material 56 is used to remove the outer tube 50. More specifically, once the inner tube 46 has hardened around the fused optical fibers, the outer tube 50 is separated by pulling the tab 56a for the embedded material 56. The embedded material may be made from any suitable material such as an aromatic polyamide fiber having high tensile strength, such as KEVLAR™. It is recognized that other materials may be used for the embedded material 56 and that methods, other than the tab, may be used to remove the embedded material 56 and separate the outer tube 50. The material 56 may be embedded into the outer tube 50 by any desirable method.

It is recognized that other methods may be used to assist in the separation and removal of the outer tube 50, including other ways to diminish the structural integrity of portion 50a, and that such methods may include various configurations. According to the present invention, it is only necessary that portion 50a sufficiently weaken the outer tube to enable or assist a user to separate and remove the outer tube 50.

When using the recoating splice sleeve as described herein, an optical fiber 42 is threaded through the inner tube 46 of the recoating splice sleeve 40. Any desired procedure for cable preparation and splicing is utilized. Optical fibers 42 and 44 are then jointed together by fusion splicing. The recoating splice sleeve is then guided along the fiber and over the point of fusion. The splice sleeve is then heated to a predetermined temperature for a predetermined period of time to soften and melt the inner tube 46. After the inner tube 46 has hardened around the fused optical fibers, the outer tube 50 is separated and removed. This is done by applying pressure at portion 50a or by tearing the outer tube 50 at portion 50a, for example. The outer tube 50 may then be discarded. The finished recoated fiber includes an outer surface formed by the fiber recoating material. The recoated fused fibers maintain flexibility while being sufficiently protected and reinforced.

According to the present invention, a simple and cost-effective splice sleeve is provided to protect and reinforce optical fibers, while maintaining fiber optic cable flexibility. More specifically, according to the present invention, fused optical fibers are recoated to obtain a flexible fiber optic cable by applying a recoating splice sleeve having a disposable outer tube, which is removed once an inner tube has cured around the point of fusion of the fused optical fibers. Any conventional heat oven can be used to melt the inner tube of the splice sleeve. Therefore, the present invention eliminates the requirement of the UV light source and the mold of the prior art recoating devices and eliminates the rigidity characteristic of prior art splice sleeves.

While particular embodiments of the invention have been shown and described, it is recognized that various modifications thereof will occur to those skilled in the art. For example, in addition to the examples shown herein, it is understood that the splice may interconnect a single optical fiber with multiple optical fibers, or interconnect a first plurality of optical fibers with a second plurality of optical fibers. In addition, the recoating heat-flowable material need not take the form of an inner tube, and can be in any shape and position in the outer tube. Therefore, the scope of the herein-described invention shall be limited solely by the claims appended hereto.

What is claimed is:

1. A splice sleeve for recoating fused optical fibers, comprising:
   an outer tube, said outer tube having a tube separation assist feature; and
   an inner hot melt tube made from a fiber recoating material disposed inside of said outer tube and having an opening therein permitting the passage of an optical fiber therethrough;
   wherein said tube separation assist feature facilitates the removal of said outer tube from said fiber recoating material.

2. The splice sleeve according to claim 1, wherein said outer tube includes an inner surface coated with a non-stick material.

3. A splice sleeve for recoating fused optical fibers, comprising:
   an outer tube, said outer tube comprising a series of perforations; and hot melt adhesive
   fiber recoating material positioned inside of said outer tube;
   wherein said series of perforations facilitates the removal of said outer tube from said fiber recoating material.

4. The splice sleeve according to claim 3, wherein said perforations extend in a longitudinal direction of said outer tube.

5. The splice sleeve according to claim 4, wherein said outer tube comprises a non-stick material.

6. The splice sleeve according to claim 4, wherein said non-stick material is a polymer of polytetrafluoroethylene.

7. The splice sleeve according to claim 3, wherein said fiber recoating material is a in the form of a tube disposed inside of said outer tube.

8. The splice sleeve according to claim 7, wherein said hollow tube comprises an inner surface coated with a non-stick material.

9. The splice sleeve according to claims 3, wherein said fiber recoating material is a hollow tube disposed inside of said outer tube.

10. A splice sleeve for recoating fused optical fibers, comprising:
    an outer tube, said outer tube comprising a tube separation assist notch; and hot melt adhesive fiber recoating material positioned inside of said outer tube;
    wherein said tube separation assist notch may be broken facilitating the removal of said outer tube from said fiber recoating material.

11. The splice sleeve according to claim 10, wherein said notch extends in a longitudinal direction of said outer tube.

12. The splice sleeve according to claim 10, wherein said outer tube comprises a non-stick material.

13. The splice sleeve according to claim 10, wherein said outer tube comprises an inner surface coated with a non-stick material.

14. A splice sleeve for recoating fused optical fibers, comprising:
an outer tube, said outer tube comprising an element embedded in said outer tube; and hot melt adhesive fiber recoating material positioned inside of said hollow tube;
wherein said embedded element may be pulled to facilitate the removal of said outer tube from said fiber recoating material.

15. The splice sleeve according to claim 14, wherein said embedded element extends in a longitudinal direction in a portion of said outer tube.

16. The splice sleeve according to claim 15, wherein said embedded element includes a portion that extends beyond a longitudinal end of the outer tube.

17. The splice sleeve according to claim 14, wherein said embedded element is an arimid fiber.

18. The splice sleeve according to claims 17, wherein said fiber recoating material is in the form of a tube disposed inside of said outer tube.

19. A sleeve configured to be inserted around a first optical fiber segment and subsequently positioned over a joined region between the first optical fiber segment and a second optical fiber segment for recoating the joined region of the first and second optical fiber portions, said sleeve comprising:
a hollow tube having a continuous wall;
fiber recoating material positioned inside of said hollow tube; and
means associated with the hollow tube for creating a separation in the wall of the hollow tube.

20. The sleeve of claim 19, wherein said means for creating a separation includes a notch extending in a longitudinal direction of said hollow tube.

21. The sleeve of claim 19, wherein said means for creating a separation includes a notch extending in a longitudinal direction of said hollow tube.

22. The sleeve of claim 19, wherein said means for creating a separation includes a series of perforations extending in a longitudinal direction of said hollow tube.

23. The sleeve of claim 19, wherein said means for creating a separation includes a material embedded in a portion of said hollow tube.

24. A splice sleeve configured to be inserted around a first optical fiber segment and subsequently positioned over a joined region between the first optical fiber segment and a second optical fiber segment for recoating the joined region of the first and second optical fiber portions, said sleeve comprising:
an outer tube formed by an encircling continuous wall and a tube separation assist feature; and
fiber recoating material positioned inside of said outer tube;
wherein said tube separation assist feature facilitates the removal of said outer tube from said fiber recoating material.

25. A method of protecting first and second optical fibers at a point of fusion, comprising:
providing a recoating sleeve comprising an outer tube, a passageway, and recoating material disposed within the outer tube;
threading the first optical fiber through the hollow passageway in the recoating sleeve;
fusing the first and second optical fibers together at a point;
positioning the recoating sleeve over the point of fusion of the fused optical fibers;
heating the recoating sleeve; and
removing the outer tube to expose the recoating material.

26. The method according to claim 25, wherein said removing step includes removing an element embedded in the outer tube.

27. The method according to claim 25, wherein said removing step includes applying pressure to said outer tube.

28. The method according to claim 25, wherein said removing step includes ripping a series of perforations.

29. The method according to claim 25, wherein said removing step includes tearing the outer tube along a preformed line.

30. A sleeve configured to be inserted around a first optical fiber segment and subsequently positioned over a joined region between the first optical fiber segment and a second optical fiber segment for recoating the joined region of the first and second optical fiber portions, said sleeve comprising:
an outer tube having a tube separation assist feature; and
an inner tube including fiber recoating material positioned inside of said outer tube, said inner tube having a hollow central region to permit the threading of an optical fiber therethough;
wherein said tube separation assist feature facilitates the removal of said outer tube from said inner tube.

31. The sleeve according to claim 30, wherein said tube separation assist feature extends in a longitudinal direction of said outer tube.

32. The sleeve according to claim 31, wherein said outer tube includes a non-stick material.

33. The sleeve according to claim 32, wherein said non-stick material is a polymer of polytetrafluoroethylene.

34. The sleeve according to claim 31, wherein said inner tube is a hot melt tube.

35. The sleeve according to claim 31, wherein said tube separation assist feature includes a series of perforations, wherein said outer tube may be removed by separating said outer tube along said perforations.

36. The sleeve according to claim 31, wherein said outer tube includes an inner surface coated with a non-stick material.

37. The sleeve according to claim 31, wherein said tube separation assist feature includes a notch, wherein said notch may be broken for removing said outer tube from said fiber recoating material.

38. The sleeve according to claim 31, wherein said tube separation assist feature includes an element embedded in said outer tube.

39. The sleeve according to claim 38, wherein said element includes an aramid fiber.

40. The sleeve according to claim 30, wherein said tube separation assist feature is a portion of said outer tube having diminished structural integrity.

41. The sleeve according to claim 40, wherein said portion includes a series of perforations.

42. The sleeve according to claim 40, wherein said portion includes a notch.

* * * * *